(12) United States Patent
Lee et al.

(10) Patent No.: US 9,742,000 B2
(45) Date of Patent: Aug. 22, 2017

(54) ELECTRODE HAVING A DUAL LAYER STRUCTURE, METHOD FOR MANUFACTURING THEREOF, AND LITHIUM SECONDARY BATTERY COMPRISING THE SAME

(71) Applicant: LG Chem, Ltd., Seoul (KR)

(72) Inventors: Sang Kyun Lee, Daejeon (KR); Je Young Kim, Daejeon (KR); Taek Soo Lee, Daejeon (KR)

(73) Assignee: LG Chem, Ltd. (KR)

( * ) Notice: Subject to any disclaimer, the term of this patent is extended or adjusted under 35 U.S.C. 154(b) by 156 days.

(21) Appl. No.: 14/834,490

(22) Filed: Aug. 25, 2015

(65) Prior Publication Data
US 2016/0099483 A1    Apr. 7, 2016

(30) Foreign Application Priority Data

Oct. 2, 2014 (KR) ......................... 10-2014-0133470

(51) Int. Cl.
| | |
|---|---|
| H01M 4/82 | (2006.01) |
| H01M 4/04 | (2006.01) |
| H01M 4/62 | (2006.01) |
| H01M 4/13 | (2010.01) |
| H01M 4/139 | (2010.01) |
| H01M 4/131 | (2010.01) |
| H01M 4/525 | (2010.01) |
| H01M 4/66 | (2006.01) |
| H01M 4/1391 | (2010.01) |
| H01M 10/052 | (2010.01) |

(52) U.S. Cl.
CPC ....... *H01M 4/0471* (2013.01); *H01M 4/0404* (2013.01); *H01M 4/13* (2013.01); *H01M 4/139* (2013.01); *H01M 4/623* (2013.01); *H01M 4/625* (2013.01); *H01M 4/131* (2013.01); *H01M 4/1391* (2013.01); *H01M 4/525* (2013.01); *H01M 4/622* (2013.01); *H01M 4/661* (2013.01); *H01M 10/052* (2013.01); *H01M 2300/004* (2013.01)

(58) Field of Classification Search
CPC ....................................... H01M 4/26
See application file for complete search history.

(56) References Cited

U.S. PATENT DOCUMENTS

2012/0177990 A1* 7/2012 Mitsuhashi ........... H01M 4/362
429/211

FOREIGN PATENT DOCUMENTS

| JP | 2008243643 A | 10/2008 |
| KR | 20140032624 A | 3/2014 |

* cited by examiner

*Primary Examiner* — Jacob Marks
(74) *Attorney, Agent, or Firm* — Lerner, David, Littenberg, Krumholz & Mentlik, LLP

(57) ABSTRACT

The present invention relates to an electrode having a dual layer structure, a method for manufacturing the same, and a lithium secondary battery comprising the same, the electrode comprising: an electrode current collector; a middle layer formed on at least one side of the electrode current collector; and an electrode active material layer formed on the middle layer, wherein the middle layer comprises a first binder, wherein the electrode active material layer comprises an electrode active material and a second binder, and wherein the first binder and the second binder are the same kind of material but have different crystalline phases.

25 Claims, 2 Drawing Sheets

ELECTRODE HAVING A DUAL LAYER STRUCTURE, METHOD FOR MANUFACTURING THEREOF, AND LITHIUM SECONDARY BATTERY COMPRISING THE SAME

CROSS REFERENCE TO RELATED APPLICATIONS

The present application claims priority from Korean Application No. 10-2014-0133470 filed Oct. 2, 2014, the disclosure of which is hereby incorporated herein by reference.

TECHNICAL FIELD

The present invention relates to an electrode having a dual layer structure, a method for manufacturing the same, and a lithium secondary battery comprising the same, the electrode comprising: an electrode current collector; a middle layer formed on at least one side of the electrode current collector; and an electrode active material layer formed on the middle layer, wherein the middle layer comprises a first binder, wherein the electrode active material layer comprises an electrode active material and a second binder, and wherein the first binder and the second binder are the same kind of material but have different crystalline phases.

BACKGROUND OF INVENTION

In recent years, a rapid growth of the electronics industry and the communications industry involving a variety of information and communications technology, including mobile communications, has led to increasing demands for greater compactness in electronic devices. To meet these demands, mobile electronics and communication terminals, such as laptops, netbooks, tablet PCs, cellphones, smartphones, PDAs, digital cameras, and camcorders, have been made widely available. As a result, there is also an increasing interest in the development of batteries, which are the driving power source for these devices.

Furthermore, with the development of electric vehicles, such as hydrogen electric vehicles or hybrid electric vehicles, and fuel cell vehicles, much attention is focused on developing a battery of high performance, high capacity, high density, high power, and high stability. Also, developing a battery having fast charging and discharging rates has become a major issue.

A battery, which is an apparatus for converting chemical energy into electrical energy, is classified as a primary battery, secondary battery, fuel cell, solar cell, or the like.

Among these, primary batteries, such as manganese batteries, alkaline batteries, and mercury batteries, produce energy through an irreversible reaction. Hence, even though primary batteries have a high capacity, they have a disadvantage of being non-recyclable, and thus, various problems including energy inefficiency, environmental pollution, etc. are inherent in this type of battery.

Examples of secondary batteries include lead-acid batteries, nickel-metal hydride batteries, nickel-cadmium batteries, lithium-ion batteries, lithium polymer batteries, lithium metal batteries, etc. Secondary batteries are chemical batteries which are capable of repeating charging and discharging cycles using reversible conversions between chemical energy and electrical energy. Because secondary batteries operate by means of reversible reactions, they have an advantage of being recyclable and eco-friendly.

A secondary battery has four basic components: a positive electrode, a negative electrode, a separator, and an electrolyte.

The positive electrode and negative electrode are electrodes in which energy conversion and storage occur through oxidation-reduction, and these electrodes respectively have a positive potential and a negative potential. The separator is placed between the positive electrode and the negative electrode to maintain electrical isolation, and also provides a channel for electric charge migration. In addition, the electrolyte serves as a medium for delivering the electric charge.

Each of the electrodes comprises a respective electrode active material. The active materials used in a lithium secondary battery, which currently is the secondary battery of most interest, are provided below.

For the most part, materials that allow the intercalation of lithium ions are used as a positive electrode active material. Examples include oxides, such as lithium cobalt oxides ($Li_xCoO_2$), lithium nickel oxides ($Li_xNiO_2$), lithium nickel cobalt oxides ($Li_x(NiCo)O_2$), lithium nickel cobalt manganese oxides ($Li_x(NiCoMn)O_2$), spinel-type lithium manganese oxides ($Li_xMn_2O_4$), and manganese dioxide ($MnO_2$); olivine-type or NASICON-type phosphates, such as lithium iron phosphates ($Li_xFePO_4$) and lithium manganese phosphates ($Li_xMnPO_4$); silicates; sulfates; and polymeric materials.

As a negative electrode active material, lithium metal or its alloys, or compounds that allow the intercalation of lithium ions, may be used. Examples include polymeric materials and carbon materials, and more specifically, graphite types such as artificial or natural graphite; and carbon types, such as non-graphitizable carbon (hard carbon), graphitizable carbon (soft carbon), carbon nanotube (CNT), carbon nanofiber (CNF), and carbon nanowall (CNW).

The above electrode may generally be manufactured by painting an electrode current collector with an electrode active material slurry and drying the slurry and thus forming an electrode active material layer. The electrode active material slurry generally comprises an electrode active material, a conductive agent, a binder and other additives such as a dispersion medium. More specifically, the electrode may be manufactured by weighing each ingredient that forms the electrode active material slurry and mixing the ingredients; coating the electrode current collector with the mixture and drying the mixture; and thereafter pressing the mixture.

As mentioned earlier, an electrode is generally structured to have an electrode current collector and an electrode active material layer formed on the electrode current collector, or additionally a middle layer, comprising a binder and a conductive agent, between the electrode current collector and the electrode active material layer in order to enhance the performance of the electrode.

However, electrodes having a middle layer as described above may be short-circuited as network paths between conductive agents become disconnected due to the expansion of the binder occurring above a certain temperature; and consequently, a battery comprising such an electrode may have degraded performance. Therefore, there is a need for developing a stable high-power electrode.

DISCLOSURE

Technical Problems

The present invention was developed to solve the above-described problems. The purpose of the present invention is to provide an electrode having a dual layer structure in which an electrode current collector; a middle layer; and an electrode active material layer are sequentially laminated, and which is manufactured by controlling the weight average molecular weight and the crystalline phase of the binder included in the middle layer, thereby preventing short-circuiting of a conductive agent as the binder expands and breaks by itself above a certain temperature.

Another purpose of the present invention is to provide a method for manufacturing the electrode having a dual layer structure.

Another purpose of the present invention is to provide a lithium secondary battery comprising the electrode.

Technical Solutions

To solve the above problems, the present invention provides an electrode having a dual layer structure, comprising: an electrode current collector; a middle layer formed on at least one side of the electrode current collector; and an electrode active material layer formed on the middle layer, wherein the middle layer comprises a first binder, wherein the electrode active material layer comprises an electrode active material and a second binder, and wherein the first binder and the second binder are the same kind of material but have different crystalline phases.

In addition, the present invention provides a method for manufacturing an electrode having a dual layer structure, comprising the steps of: preparing a predispersed slurry comprising a third binder (step 1); forming a middle layer by coating at least one side of an electrode current collector with the predispersed slurry (step 2); and forming an electrode active material by coating the middle layer with an electrode active material slurry comprising a fourth binder (step 3), wherein the third binder and the fourth binder are the same kind of material but have different molecular weights.

Furthermore, the present invention provides a lithium secondary battery comprising the electrode having a dual layer structure.

Advantageous Effects

The electrode having a dual layer structure according to the present invention is capable of improving the dispersibility of the first binder and the conductive agent within the middle layer as the weight average molecular weight of the first binder, included in the middle layer, is controlled, and is also capable of preventing short-circuiting of the conductive agent caused by the expansion of the first binder at high temperatures (e.g., 140-160° C.) as the crystalline phase of the first binder is controlled.

DESCRIPTION OF DRAWINGS

The following drawings accompanied in this specification are provided to exemplify preferred embodiments of the present invention, and serve to aid in understanding the scope of the present invention in conjunction with the above-described contents of the present invention. Therefore, it should be understood that the present invention is not limited to the contents shown in these drawings.

DETAILED DESCRIPTION OF EMBODIMENTS

Hereinafter, the present invention will be described in further detail in order to aid in understanding the present invention.

The terms and words used in the specification and claims of the present application are not to be construed as limited to ordinary or dictionary meanings, but should be construed as meanings and concepts conforming to the technical spirit of the present invention on the basis of the principle that the inventors can suitably define the concept of the terms in order to best explain the instant invention.

The present invention provides a stable high-power electrode having a dual layer structure in which an electrode current collector; a middle layer; and an electrode active material layer are sequentially laminated, wherein the binders included in the middle layer and the electrode active material layer have been controlled to have different weight average molecular weights and crystalline phases.

The electrode having a dual layer structure according to one embodiment of the present invention comprises: an electrode current collector; a middle layer formed on at least one side of the electrode current collector; and an electrode active material layer formed on the middle layer, wherein the middle layer comprises a first binder, wherein the electrode active material layer comprises an electrode active material and a second binder, and wherein the first binder and the second binder are the same kind of material but have different crystalline phases.

In addition, the first binder and the second binder may be the same kind of material but have different weight average molecular weights.

Here, the phrase "being the same kind of material" refers to their substantial materials being the same kind. For example, the first binder may be polyvinylidene fluoride and the second binder may also be polyvinylidene fluoride.

More specifically, the first binder may be the same kind of material as the second binder, but have its weight average molecular weight and crystalline phase controlled by the method described below.

Based on measurements using gel permeation chromatography (GPC), the first binder may have a weight average molecular weight ranging from 60,000 to less than 270,000, and an α/β ratio ranging from 0.3 to 0.8. Here, α represents the α crystalline phase within the first binder, and β represents the β crystalline phase within the first binder.

The second binder may have a weight average molecular weight ranging from 330,000 to 1,000,000, and an α/β ratio ranging from 0.05 to 0.25.

The weight average molecular weight may be measured at 40° C. using a GPC measuring equipment (SYSTEM-21 Shodex, PL gel MIXED-B), and the crystalline phase may be measured by nuclear magnetic resonance (NMR).

Figure 1:
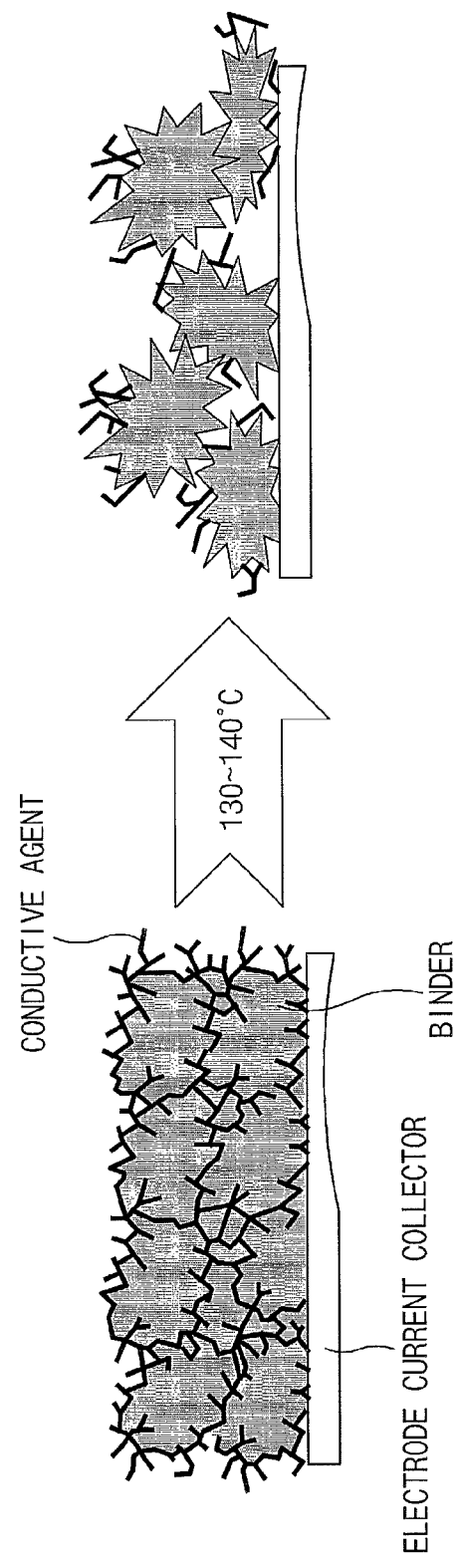
FIG. 1 schematically illustrates the heat-induced behavior of the middle layer portion of an electrode having a dual layer structure according to conventional techniques.

The electrode according to the present invention can improve the dispersibility of the first binder and the conductive agent within the middle layer as the weight average molecular weight of the first binder, included in the middle layer, is controlled, and can prevent short-circuiting of the conductive agent caused by the expansion of the first binder at high temperatures (see FIG. 1) as the crystalline phase of the first binder is controlled. That is, by controlling the crystalline phase of the first binder, the binder may serve as a positive temperature coefficient (PTC) material.

The first binder and the second binder may each be at least one selected from the group consisting of: poly(vinylidene fluoride-co-hexafluoropropylene) (PVDF-co-HFP), polyvinylidene fluoride, chlorotrifluoroethylene (CTFE), polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, ethylene-propylene-diene monomer (EPDM), sulfonated EPDM, styrene-butadiene rubber (SBR), and fluororubber. Preferably, the first binder and the second binder may both be polyvinylidene fluoride, PVDF-co-HFP, or CTFE.

The electrode according to the present invention may be a negative electrode or a positive electrode, preferably a positive electrode. Furthermore, if the electrode is a positive electrode, then the electrode active material may be a positive electrode active material.

The positive electrode active material may be at least one selected from the group consisting of: an oxide of the following formulae 1 to 3; $V_2O_5$, TiS, and MoS.

$$Li_{1+x}[Ni_aCo_bMn_c]O_2 \quad \text{[Formula 1]}$$

(where $-0.5 \leq x \leq 0.6$; $0 \leq a, b, c \leq 1$; $x+a+b+c=1$)

$$LiMn_{2-x}M_xO_4 \quad \text{[Formula 2]}$$

(where M is one or more elements selected from the group consisting of: Ni, Co, Fe, P, S, Zr, Ti, and Al; $0 \leq x \leq 2$)

$$Li_{1+a}Fe_{1-x}M_x(PO_{4-b})X_b \quad \text{[Formula 3]}$$

(where M is one or more elements selected from the group consisting of: Al, Mg, Ni, Co, Mn, Ti, Ga, Cu, V, Nb, Zr, Ce, In, Zn, and Y; X is one or more elements selected from the group consisting of: F, S, and N; $-0.5 \leq a \leq +0.5$; $0 \leq x \leq 0.5$; $0 \leq b \leq 0.1$)

More specifically, the positive electrode active material may be at least one selected from the group consisting of: $LiCoO_2$, $LiNiO_2$, $LiMnO_2$, $LiMn_2O_4$, $Li[Ni_aCo_bMn_c]O_2$ (where $0<a, b, c \leq 1$; $a+b+c=1$), and $LiFePO_4$.

The middle layer according to the present invention may have a thickness ranging from 0.5 μm to 5 μm, and the electrode active material layer may have a thickness ranging from 40 μm to 100 μm.

Furthermore, the present invention provides a method for manufacturing the above electrode having a dual layer structure.

The manufacturing method according to one embodiment of the present invention comprises the steps of: preparing a predispersed slurry comprising a third binder (step 1); forming a middle layer by coating at least one side of an electrode current collector with the predispersed slurry (step 2); and forming an electrode active material layer by coating the middle layer with an electrode active material slurry comprising a fourth binder (step 3), wherein the third binder and the fourth binder are the same kind of material but have different molecular weights.

The electrode according to the present invention may be a positive electrode or a negative electrode. If the electrode is a positive electrode, then the electrode active material may be a positive electrode active material, and if the electrode is a negative electrode, then the electrode active material may be a negative electrode active material. That is, the method for manufacturing an electrode according to the present invention is not limited to a positive electrode or a negative electrode in particular, but may easily be applied to manufacturing any type of electrode, and different electrodes may be manufactured according to the materials used for manufacturing the respective electrodes (for example, a positive electrode active material or a negative electrode active material). Preferably, the above manufacturing method may be more useful for manufacturing a positive electrode. Therefore, the term "electrode" used below, as in "electrode active material," "electrode current collector," etc., may refer to both a positive electrode and a negative electrode unless specifically indicated otherwise.

The above step 1 is a step for preparing a predispersed slurry with high dispersibility, and a predispersed slurry comprising a third binder is prepared by addition of a conductive agent to a fourth binder and high-shear mixing of the same, thereby reducing the weight average molecular weight of the fourth binder and enhancing dispersibility. That is, the third binder may be the same kind of material as the fourth binder but have a different weight average molecular weight. The third binder may have a weight average molecular weight ranging from 60,000 to less than 270,000, and the fourth binder may have a weight average molecular weight ranging from 330,000 to 1,000,000.

The method of high-shear mixing is not particularly limited but may be carried out using a high-shear mixer, such as a Microfluidizer, a bead mill, a fill mixer, or a planetary dispersive mixer. More specifically, the mixing may be carried out under a pressure condition of 20,000 psi to 40,000 psi, or under an agitation speed condition of 10,000 rpm to 200,000 rpm.

The materials that are allowed as the third binder and the fourth binder may be identical to those described earlier as the first binder and the second binder.

The type of conductive agent is not particularly limited as long as it exhibits conductivity without causing a side reaction with other elements of the battery concerned. For example, graphite such as natural graphite or artificial graphite; carbon black such as carbon black (super-p), acetylene black, Ketjen black, channel black, furnace black, lamp black, and thermal black; a conductive fiber such as a carbon fiber or a metal fiber; a metal powder such as fluorocarbon, aluminum, and nickel powder; a conductive whisker such as zinc oxide and potassium titanate; a conductive metal oxide such as titanium oxide; or a conductive material, such as polyphenylene derivatives, may be used as the conductive agent.

The above step 2 is a step for forming a middle layer by coating at least one side of an electrode current collector with the predispersed slurry, and may be carried out by painting at least one side of the electrode current collector with the predispersed slurry and drying the slurry.

The electrode current collector may generally have a thickness ranging from 3 μm to 500 μm, and its type is not particularly limited as long as it exhibits high conductivity without causing a chemical change in the battery concerned. For example, copper; stainless steel; aluminum; nickel; titanium; calcined carbon; or aluminum or stainless steel surface-treated with carbon, nickel, titanium, or silver may be used as the electrode current collector.

The coating in step 2 comprises a painting step and a drying step. The method of painting is not particularly limited but may be carried out using a method well known in the art, for example, by spraying or distributing the predispersed slurry on the electrode current collector and thereafter evenly dispersing the slurry using a doctor blade, etc. Besides, a method such as die casting, comma coating, and screen printing may be used to carry out the painting.

The drying may be carried out by conducting heat treatment for 10 to 24 hours at a temperature range of 140° C. to 160° C. Using the manufacturing method according to the present invention, a first binder is formed through controlling the crystalline phase of the third binder, by painting at least one side of an electrode current collector with a predispersed slurry comprising the third binder and heat treating the slurry using the above drying method. That is, the first binder is produced from heat treating the third binder. The first binder may have an α/β ratio ranging from 0.3 to 0.8, as described above, and the middle layer may comprise the first binder therein.

The above step 3 is a step for forming an electrode active material layer on the middle layer and thereby manufacturing an electrode having a dual layer structure, and this step may be carried out by coating the middle layer with an electrode active material slurry comprising a fourth binder.

Here, the electrode active material slurry may comprise additives such as an electrode active material, a fourth binder, a conductive agent, and a filler.

The electrode active material may be a positive electrode active material or a negative electrode active material, as described above.

The positive electrode active material may be as described above.

The type of negative electrode active material is not particularly limited but may be lithium metal, silicon, tin, or a carbon material capable of absorbing and releasing lithium ions, all of which are well known in the art. Preferably, the above carbon material may be used. Both carbon of low crystalline phase and carbon of high crystalline phase may be used as the carbon material. The carbon of low crystalline phase may be soft carbon or hard carbon. The carbon of high crystalline phase may be natural graphite, kish graphite, pyrolytic carbon, mesophase pitch based carbon fiber, mesocarbon microbeads, mesophase pitch, or high-temperature calcined carbon, such as petroleum or coal tar pitch derived coke.

The conductive agent may be as described above. The filler is an ingredient for suppressing the expansion of an electrode, and whether to use the filler may be determined according to need. The type of filler is not particularly limited as long as it is a fibrous material that does not cause a chemical change in the battery concerned. For example, an olefin polymer such as polyethylene and polypropylene; or a fibrous material, such as glass fiber and carbon fiber, may be used as the filler.

In addition, a dispersion medium may be used as needed. The type of dispersion medium is not particularly limited but may be, for example, isopropyl alcohol, N-methylpyrrolidone (NMP), or acetone.

The coating in step 3 comprises a painting step and a drying step. The method of painting is not particularly limited but may be carried out using a method well known in the art, and more specifically, may be as described above.

The drying may be carried out by conducting heat treatment for 10 to 24 hours at a temperature range of 120° C. to 140° C. Using the manufacturing method according to the present invention, a second binder is formed through controlling the crystalline phase of the fourth binder, by painting the middle layer with an electrode active material slurry comprising the fourth binder and heat treating the slurry using the above drying method. That is, the second binder is produced from heat treating the fourth binder. The second binder may have an α/β ratio ranging from 0.05 to 0.25, as described above, and the electrode active material layer may comprise the second binder therein.

Furthermore, the present invention provides a lithium secondary battery comprising the above electrode having a dual layer structure.

The lithium secondary battery according to one embodiment of the present invention is characterized by comprising a positive electrode, a negative electrode, a separator interposed between the positive electrode and the negative electrode, and an electrolyte.

Here, at least one of the positive electrode and the negative electrode may have been manufactured according to the above manufacturing method.

The separator may be an electrically insulating thin film having high ion permeability and mechanical strength, and may generally have a pore diameter ranging from 0.01 μm to 10 μm and a thickness ranging from 5 μm to 300 μm. For such a separator, a porous polymer film, for example, a porous polymer film which is manufactured from a polyolefin polymer, such as ethylene homopolymer, propylene homopolymer, ethylene/butene copolymer, ethylene/hexene copolymer, and ethylene/methacrylate copolymer, may be used either alone or as a lamination. Alternatively, a common porous nonwoven fabric, for example, a nonwoven fabric made of a glass fiber with a high melting point, polyethylene terephthalate fiber, or the like, may be used. However, the type of separator is not limited to these examples.

In addition, the type of electrolyte is not particularly limited, but may comprise an organic solvent and a lithium salt that are commonly used in electrolytes.

The anion of the lithium salt may be at least one selected from the group consisting of: $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3CO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The organic solvent may be at least one selected from the group consisting of: propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran may typically be used.

Particularly, among the carbonate based organic solvents, ethylene carbonate and propylene carbonate, which are cyclic carbonates, may preferably be used, as they are organic solvents of high viscosity and have a high dielectric constant and thus effectively dissociate lithium salts in an electrolyte. More preferably, such a cyclic carbonate, dimethyl carbonate, and a linear carbonate of low viscosity and low dielectric constant, such as diethyl carbonate, may be used as they can be mixed in suitable proportions to make an electrolyte having high electric conductivity.

In addition, the electrolyte may further comprise: pyridine, triethyl phosphate, triethanolamine, cyclic ethers, ethylenediamine, n-glyme, hexaphosphoric acid triamide, nitrobenzene derivatives, sulfur, quinoneimine dye, N-substituted oxazolidinone, N,N-substituted imidazolidine, ethylene glycol dialkyl ethers, ammonium salts, pyrrole, 2-methoxyethanol, trichloroaluminium, etc. as needed, in order to improve charging and discharging characteristics, flame resistance, etc. In some cases, the electrolyte may further comprise: a halogen-containing solvent, such as carbon tetrachloride and trifluoroethylene, to achieve non-flammability; carbon dioxide gas to improve high-temperature storage characteristics; or fluoroethylene carbonate (FEC), propene sulfone (PRS), fluoropropylene carbonate (FPC), or the like.

The lithium secondary battery according to the present invention may be manufactured by placing a separator between a positive electrode and a negative electrode and forming an electrode assembly, followed by inserting the electrode assembly into a cylindrical or angular shape battery case and then injecting an electrolyte. Alternatively, the battery may be manufactured by impregnating the electrode assembly with an electrolyte, following the lamination of the assembly, and thereafter inserting the resulting product into a battery case and sealing the case.

The battery case used in the present invention may be any of those typically used in the art. The outer shape of the battery case is not particularly limited according to the use of the battery, but may be, for example, a cylindrical shape using a can, an angular shape, a pouch-like shape, or a coin-like shape.

The lithium secondary battery according to the present invention may be used not only for a battery cell which is used as a power source for small devices, but also as a unit cell in a medium-to-large battery module comprising multiple battery cells. Suitable examples of the medium-to-large device include, but are not limited to, electric vehicles, hybrid electric vehicles, plug-in hybrid electric vehicles, power storage systems, etc.

Hereinafter, the present invention will be described in further detail using the following examples and experimental example. However, the following examples and experimental example are provided only to exemplify the present invention, and thus the scope of the present invention is not limited to these examples.

EXAMPLE 1

Polyvinylidene fluoride (Mw=380,000) and Denka black (BET=60 m$^2$/g, DBP=200 ml/100 g) were dispersed using a Microfluidizer (model name, company name) under a pressure condition of 25,000 psi, and were painted onto an aluminum thin film to a thickness of 2 µm. Here, the polyvinylidene fluoride and Denka black were used in a weight ratio of 7:3. Afterwards, they were vacuum dried for 10 hours at 140° C. and a middle layer was formed on the aluminum thin film. Polyvinylidene fluoride present in the middle layer had a weight average molecular weight of 200,000 and a crystalline phase ($\alpha/\beta$) of 0.45. The middle layer thus formed was painted with an electrode active material slurry in which LiCoO$_2$, polyvinylidene fluoride (Mw=380,000), and Denka black (BET=60 m$^2$/g, DBP=200 ml/100 g) had been mixed in a 96:2:2 ratio. Thereafter, they were vacuum dried for 10 hours at 140° C., and thus a positive electrode having a dual layer structure was manufactured.

Lithium metal was used as a negative electrode. A Celgard separator was interposed between the negative electrode and the positive electrode, and they were laminated to form an electrode assembly. After the assembly was punched in a coin-like shape, an electrolyte having 1 M of LiPF$_6$ dissolved in a mixed solvent of propylene carbonate (PC), ethyl methyl carbonate (EMC), and ethylene carbonate (EC) (PC:EMC:EC=3:4:3) was injected into the assembly to produce a lithium secondary battery for testing.

EXAMPLE 2

A middle layer was formed and a lithium secondary battery was manufactured using the same method as that of Example 1, except for vacuum drying for 10 hours at 150° C. Polyvinylidene fluoride present in the middle layer had a weight average molecular weight of 250,000 and a crystalline phase ($\alpha/\beta$) of 0.42.

COMPARATIVE EXAMPLE

Polyvinylidene fluoride (Mw=380,000) and Denka black (BET=60 m$^2$/g, DBP=200 ml/100 g) were mixed and then painted onto an aluminum thin film to a thickness of 2 µm to form a painted layer. Polyvinylidene fluoride present in the painted layer had a weight average molecular weight of 300,000 and a crystalline phase ($\alpha/\beta$) of 0.15. The painted layer thus formed was painted with an electrode active material slurry in which LiCoO$_2$, polyvinylidene fluoride (Mw=380,000) and Denka black (BET=60 m$^2$/g, DBP=200 ml/100 g) had been mixed in a 96:2:2 ratio. Thereafter, they were vacuum dried for 10 hours at 140° C., and thus a positive electrode having a dual layer structure was manufactured.

Lithium metal was used as a negative electrode. A Celgard separator was interposed between the negative electrode and the positive electrode, and they were laminated to form an electrode assembly. After the assembly was punched in a coin-like shape, an electrolyte having 1 M of LiPF$_6$ dissolved in a mixed solvent of propylene carbonate (PC), ethyl methyl carbonate (EMC), and ethylene carbonate (EC) (PC:EMC:EC=2:3:5) was injected into the assembly to produce a lithium secondary battery for testing.

EXPERIMENTAL EXAMPLE

A comparative analysis was performed regarding the positive temperature coefficient (PTC) effect of each lithium secondary battery manufactured in Example 1, Example 2, and the Comparative Example. The results are shown in the following Table 1 and FIG. 2.

Here, the analysis of the PTC effect was carried out by measuring the resistance of each lithium secondary battery in an oven while increasing the temperature by 5° C./min, and determining the interval in which the resistance sharply increased compared to the initial value (the PTC effect).

TABLE 1

| Classification | Crystalline phase $\alpha/\beta$ (at the middle layer) | Temperature at which resistance sharply increases |
|---|---|---|
| Example 1 | 0.45 | 121° C. |
| Example 2 | 0.42 | 135° C. |
| Comparative Example 1 | 0.15 | — |

As shown in Table 1, the lithium secondary batteries of Example 1 and Example 2, which comprise a positive electrode having a dual layer structure with a middle layer of a crystalline phase ($\alpha/\beta$) according to the present invention, exhibited a PTC effect in which the resistance sharply increased at a certain temperature. On the other hand, an interval of a sharp increase in resistance was not observed within the tested temperature range for the lithium secondary battery of the Comparative Example, comprising a positive electrode that does not have a middle layer of a crystalline phase according to the present invention.

Figure 2:
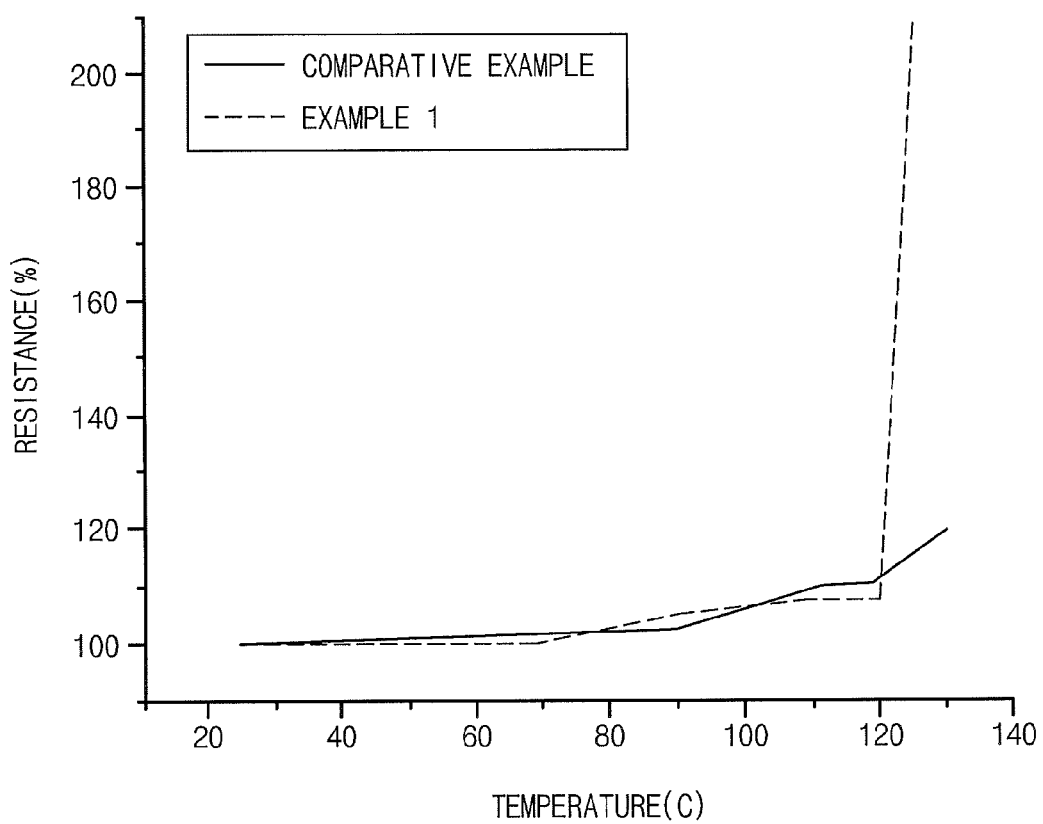
FIG. 2 is a graph illustrating the heat-induced resistance characteristic behavior of a lithium secondary battery according to one embodiment of the present invention, comprising a positive electrode having a dual layer structure with a middle layer comprising a binder of which the weight average molecular weight and the crystalline phase have been controlled.

Furthermore, as shown in FIG. 2, the lithium secondary battery of Example 1, according to the present invention, clearly exhibited a PTC effect in which the level of resistance increase was less than or equal to twice the initial resistance up to below 120° C. and the resistance sharply increased once the temperature exceeded 120° C. However, within the temperature range tested, the lithium secondary battery of the Comparative Example did not show any sharp increase in resistance compared to the initial value.

The above results demonstrate that the positive electrode having a dual layer structure comprising a middle layer of a crystalline phase according to the present invention, and the lithium secondary battery using the electrode have a self-regulating function for suppressing short-circuiting caused by specific events occurring within the battery.

The invention claimed is:

1. An electrode having a dual layer structure, comprising:
   an electrode current collector;
   a middle layer formed on at least one side of the electrode current collector; and
   an electrode active material layer formed on the middle layer,
   wherein the middle layer comprises a first binder,
   wherein the electrode active material comprises an electrode active material and a second binder, and wherein the first binder and the second binder are the same kind of material but have different crystalline phases and different molecular weights.

2. The electrode having a dual layer structure according to claim 1, wherein the first binder has an α/β ratio ranging from 0.3 to 0.8.

3. The electrode having a dual layer structure according to claim 1, wherein the second binder has an α/β ratio ranging from 0.05 to 0.25.

4. The electrode having a dual layer structure according to claim 1, wherein the first binder has a weight average molecular weight ranging from 60,000 to less than 270,000.

5. The electrode having a dual layer structure according to claim 1, wherein the second binder has a weight average molecular weight ranging from 330,000 to 1,000,000.

6. The electrode having a dual layer structure according to claim 1, wherein the first binder and the second binder are at least one selected from the group consisting of: poly (vinylidene fluoride-co-hexafluoropropylene) (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, ethylene-propylene-diene monomer (EPDM), sulfonated EPDM, styrene-butadiene rubber (SBR), and fluororubber.

7. The electrode having a dual layer structure according to claim 1, wherein the electrode is a positive electrode and the electrode active material is a positive electrode active material.

8. The electrode having a dual layer structure according to claim 7, wherein the positive electrode active material is at least one selected from the group consisting of:
   an oxide of the following formulae 1 to 3; V2O5, TiS, and MoS Li1+x[NiaCobMnc]O2     [Formula 1]

(where −0.5≤x≤0.6; 0≤a, b, c≤1; x+a+b+c=1)

LiMn2−xMxO4     [Formula 2]

(where M is one or more elements selected from the group consisting of: Ni, Co, Fe, P, S, Zr, Ti, and Al; 0≤x≤2)

Li1+aFe1−xMx(PO4−b)Xb     [Formula 3]

(where M is one or more elements selected from the group consisting of: Al, Mg, Ni, Co, Mn, Ti, Ga, Cu, V, Nb, Zr, Ce, In, Zn, and Y; X is one or more elements selected from the group consisting of: F, S, and N; −0.5≤a≤+0.5; 0≤x≤0.5; 0≤b≤0.1).

9. The electrode having a dual layer structure according to claim 7, wherein the positive electrode active material is at least one selected from the group consisting of: LiCoO2, LiNiO2, LiMnO2, LiMn2O4, Li[NiaCobMnc]O2 (where 0<a, b, c≤1; a+b+c=1), and LiFePO4.

10. The electrode having a dual layer structure according to claim 1, wherein the middle layer has a thickness ranging from 0.5 μm to 5 μm.

11. The electrode having a dual layer structure according to claim 1, wherein the electrode active material layer has a thickness ranging from 40 μm to 120 μm.

12. A method for manufacturing an electrode having a dual layer structure according to claim 1, comprising the steps of:
   1) preparing a predispersed slurry comprising a third binder;
   2) forming a middle layer by coating at least one side of an electrode current collector with the predispersed slurry; and
   3) forming an electrode active material by coating the middle layer with an electrode active material slurry comprising a fourth binder,
   wherein the third binder and the fourth binder are the same kind of material but have different molecular weights.

13. The method for manufacturing an electrode having a dual layer structure according to claim 12, wherein the predispersed slurry of step 1) is prepared by addition of a conductive agent to the fourth binder and high-shear mixing of the same.

14. The method for manufacturing an electrode having a dual layer structure according to claim 13, wherein the high-shear mixing is carried out under a pressure condition of 20,000 psi to 40,000 psi.

15. The method for manufacturing an electrode having a dual layer structure according to claim 12, wherein the coating of step 2) comprises a painting step and a drying step, wherein the drying is carried out by conducting heat treatment for 10 to 24 hours at a temperature range of 140° C. to 160° C.

16. The method for manufacturing an electrode having a dual layer structure according to claim 12, wherein the coating of step 3) comprises a painting step and a drying step, wherein the drying is carried out by conducting heat treatment for 10 to 24 hours at a temperature range of 120° C. to 140° C.

17. The method for manufacturing an electrode having a dual layer structure according to claim 12, wherein the middle layer comprises a first binder, the electrode active material layer comprises a second binder, and the first binder and the second binder are the same kind of material but have different crystalline phases.

18. The method for manufacturing an electrode having a dual layer structure according to claim 17, wherein the first binder is formed by heat treating the third binder, and the first binder has an α/β ratio ranging from 0.3 to 0.8.

19. The method for manufacturing an electrode having a dual layer structure according to claim 17, wherein the second binder is formed by heat treating the fourth binder, and the second binder has an α/β ratio ranging from 0.05 to 0.25.

20. The method for manufacturing an electrode having a dual layer structure according to claim 12, wherein the third binder has a weight average molecular weight ranging from 60,000 to less than 270,000.

21. The method for manufacturing an electrode having a dual layer structure according to claim 12, wherein the fourth binder has a weight average molecular weight ranging from 330,000 to 1,000,000.

22. The method for manufacturing an electrode having a dual layer structure according to claim 12, wherein the electrode is a positive electrode and the electrode active material is a positive electrode active material.

23. The method for manufacturing an electrode having a dual layer structure according to claim 12, wherein the positive electrode active material is a mixture of: at least one selected from the group consisting of: an oxide of the following formulae 1 to 3; V2O5, TiS, and MoS $$Li_{1+x}[Ni_aCo_bMn_c]O_2 \quad \text{[Formula 1]}$$

(where $-0.5 \leq x \leq 0.6$; $0 \leq a, b, c \leq 1$; $x+a+b+c=1$)

$$LiMn_{2-x}M_xO_4 \quad \text{[Formula 2]}$$

(where M is one or more elements selected from the group consisting of: Ni, Co, Fe, P, S, Zr, Ti, and Al; $0 \leq x \leq 2$)

$$Li_{1+a}Fe_{1-x}M_x(PO_{4-b})X_b \quad \text{[Formula 3]}$$

(where M is one or more elements selected from the group consisting of: Al, Mg, Ni, Co, Mn, Ti, Ga, Cu, V, Nb, Zr, Ce, In, Zn, and Y; X is one or more elements selected from the group consisting of: F, S, and N; $-0.5 \leq a \leq +0.5$; $0 \leq x \leq 0.5$; $0 \leq b \leq 0.1$).

24. The method for manufacturing an electrode having a dual layer structure according to claim 22, wherein the positive electrode active material is at least one selected from the group consisting of: $LiCoO_2$, $LiNiO_2$, $LiMnO_2$, $LiMn_2O_4$, $Li[Ni_aCo_bMn_c]O_2$ (where $0<a, b, c \leq 1$; $a+b+c=1$), and $LiFePO_4$.

25. A lithium secondary battery comprising an electrode having a dual layer structure according to claim 1.

* * * * *